US008966642B2

(12) United States Patent
Quinn et al.

(10) Patent No.: US 8,966,642 B2
(45) Date of Patent: Feb. 24, 2015

(54) TRUST VERIFICATION OF A COMPUTING PLATFORM USING A PERIPHERAL DEVICE (75) Inventors: Rian Quinn, Rome, NY (US); Jacob Torrey, Ava, NY (US)

(73) Assignee: Assured Information Security, Inc., Rome, NY (US)

( * ) Notice: Subject to any disclaimer, the term of this patent is extended or adjusted under 35 U.S.C. 154(b) by 319 days.

(21) Appl. No.: 13/435,015

(22) Filed: Mar. 30, 2012

(65) Prior Publication Data
US 2012/0260345 A1    Oct. 11, 2012

Related U.S. Application Data (60) Provisional application No. 61/471,998, filed on Apr. 5, 2011.

(51) Int. Cl.
*G06F 7/04*    (2006.01)
*G06F 17/30*    (2006.01)
*H04N 7/16*    (2011.01)
(Continued)

(52) U.S. Cl.
CPC .............. *G06F 21/57* (2013.01); *G06F 21/79* (2013.01); *G06F 21/577* (2013.01); *G06F 21/572* (2013.01); *G06F 2221/2149* (2013.01); *G06F 2221/2103* (2013.01); *G06F 2221/2143* (2013.01); *G06F 2221/2153* (2013.01)
USPC .................. 726/26; 726/27; 726/28; 726/29; 726/30; 713/2

(58) Field of Classification Search
CPC ......... G06F 21/00; G06F 21/02; G06F 21/57; G06F 21/79; G06F 21/572; G06F 21/577; G06F 2221/2149

USPC ........................................... 713/2; 726/26–30
See application file for complete search history.

(56) References Cited

U.S. PATENT DOCUMENTS 7,441,118 B2 *    10/2008 Lawman et al. .............. 713/164
7,624,428 B2 *    11/2009 Abhinkar et al. ................. 726/2
(Continued)

FOREIGN PATENT DOCUMENTS

EP    1 739 589 A2    1/2007
EP    2 207 120 A2    7/2010

OTHER PUBLICATIONS

Notification of Transmittal of the International Search Report (ISR) & the Written Opinion of the International Searching Authority (ISA) for International Application No. PCT/US2012/031359, dated Jul. 11, 2012.

(Continued)

*Primary Examiner* — Jeffrey Pwu
*Assistant Examiner* — Jayesh Jhaveri
(74) *Attorney, Agent, or Firm* — Matthew M. Hulihan, Esq.; Heslin Rothenberg Farley & Mesiti P.C.

(57) ABSTRACT

Verification of trustworthiness of a computing platform is provided. The trustworthiness of the computing platform is dynamically assessed to determine whether a root of trust exists on the computing platform. Responsive to determining existence of the root of trust, data is unsealed from a sealed storage facility. The sealed storage facility is unsealed responsive to a root of trust being determined to exist on the computing platform. The data can be used to attest to the trustworthiness of the computing platform to other device on a network.

11 Claims, 6 Drawing Sheets (51) Int. Cl.
*G06F 21/57* (2013.01)
*G06F 21/79* (2013.01)

(56) References Cited

U.S. PATENT DOCUMENTS

| | | | |
|---|---|---|---|
| 7,725,737 B2 | 5/2010 | Konanka et al. | |
| 7,797,544 B2 | 9/2010 | Dillaway et al. | |
| 8,060,934 B2* | 11/2011 | Cabuk et al. | 726/22 |
| 8,230,500 B1* | 7/2012 | Spertus et al. | 726/22 |
| 8,341,393 B2* | 12/2012 | Springfield et al. | 713/100 |
| 8,387,046 B1* | 2/2013 | Montague et al. | 718/1 |
| 8,397,306 B1* | 3/2013 | Tormasov | 726/27 |
| 8,719,925 B1* | 5/2014 | Berg | 726/22 |
| 8,843,997 B1* | 9/2014 | Hare | 726/3 |
| 2003/0028807 A1* | 2/2003 | Lawman et al. | 713/201 |
| 2005/0033987 A1* | 2/2005 | Yan et al. | 713/201 |
| 2005/0283601 A1 | 12/2005 | Tahan | |
| 2007/0192864 A1 | 8/2007 | Bryant et al. | |
| 2007/0271610 A1* | 11/2007 | Grobman | 726/22 |
| 2008/0270603 A1* | 10/2008 | Berger et al. | 709/224 |
| 2009/0013406 A1* | 1/2009 | Cabuk et al. | 726/22 |
| 2009/0158026 A1 | 6/2009 | Charles et al. | |
| 2009/0204964 A1* | 8/2009 | Foley et al. | 718/1 |
| 2009/0319793 A1 | 12/2009 | Zic et al. | |
| 2010/0115625 A1* | 5/2010 | Proudler | 726/27 |
| 2010/0223656 A1* | 9/2010 | Ray et al. | 726/3 |
| 2011/0099361 A1* | 4/2011 | Shah et al. | 713/2 |
| 2011/0154010 A1 | 6/2011 | Springfield et al. | |
| 2012/0198514 A1* | 8/2012 | McCune et al. | 726/1 |

OTHER PUBLICATIONS

Coker et al., "Principles of Remote Attestation", International Journal of Information Security, pp. 1-36 (2010).

Intel TXT, "Malware Protection with Intel Trusted Execution Technology", http://www.intel/com/content/www/us/en/architecture-and-technology/trusted-execution-technology/malware-reduction-general-technology.html, pp. 1-2 (2012).

'Lightweight Portable Security', http://www.spi.dod.mil/lipose.htm, pp. 1-2 (Jun. 15, 2011).

Martignoni et al., "Conqueror: Tamper-Proof Code Execution on Legacy Systems", Detection of Intrusions and Malware, and Vulnerability Assessment, 7th International Conference, DIMVA 2010, pp. 21-40 (Jul. 8-9, 2010).

Parno et al., "Boostrapping Trust in Commodity Computers", IEEE SP'10 (May 2010).

Seshadri et al., "Pioneer: Verifying Code Integrity and Enforcing Untampered Code Execution on Legacy Systems", Proceedings of the Twentieth ACM Symposium on Operating Systems Principles, vol. 39, No. 5, pp. 1-16 (Dec. 2005).

WinHEC, "AMD Platform for Trustworthy Computing", Microsoft Windows Hardware Engineering Conference, pp. 1-21 (2003).

* cited by examiner

TRUST VERIFICATION OF A COMPUTING PLATFORM USING A PERIPHERAL DEVICE

CROSS REFERENCE TO RELATED APPLICATIONS

This application claims the benefit of U.S. provisional patent application Ser. No. 61/471,998, filed Apr. 5, 2011, which is hereby incorporated herein by reference in its entirety.

BACKGROUND

One approach for ensuring that a computing platform is trustworthy is to establish existence of a root of trust. A root of trust refers to an environment where code may be executed without fear of compromise. A simple example of a root of trust is firmware on read only memory (ROM). ROM firmware is capable of being a root of trust because it, by its very nature, is read-only and therefore cannot be modified, for instance by a malicious attacker. A dynamic root of trust measurement (DRTM) is used to dynamically, that is, at any point during a computer system's lifecycle, establish a root of trust. A DRTM can also be used to reestablish trust of a computer system subsequent to a security compromise caused by malware on the system.

While an evaluation of trust can be useful for establishing trustworthiness of a computing platform, there are drawbacks to current implementations of a DRTM, and in particular when extended to establishing trustworthiness across and among a network of computing platforms. What is needed is an effective and convenient means for establishing end-to-end trust of multiple computing platforms of a network, wherein each computing platform on the network is to be individually evaluated and attested as to its trustworthiness, and wherein each computing platform communicates its trust measurements to other computing platforms, evaluates trust measurements of other computing platforms, and enables/disables services to other computing platforms based on their trustworthiness.

BRIEF SUMMARY

The shortcomings of the prior art are overcome and additional advantages are provided through the provision of a system for facilitating verification of trustworthiness of a computing platform. The system includes, for instance, a peripheral device configured to couple to the computing platform. The peripheral device includes a memory and a processor in communications with the memory, and the peripheral device is configured to facilitate performing a method that includes dynamically assessing trustworthiness of the computing platform, the dynamically assessing including determining whether a root of trust exists on the computing platform, the root of trust including a trusted execution environment, and responsive to determining existence of the root of trust on the computing platform, automatically unsealing data from a sealed storage facility of the peripheral device, the sealed storage facility being unsealed responsive to a root of trust being determined by the peripheral device to exist on the computing platform.

Further, a method for facilitating verification of trustworthiness of a computing platform is provided. The method includes, for instance, providing a peripheral device configured to couple to the computing platform, the peripheral device including a memory and a processor, in communications with the memory, wherein the peripheral device is configured to facilitate performing a method that includes dynamically assessing trustworthiness of the computing platform, the dynamically assessing including determining whether a root of trust exists on the computing platform, the root of trust including a trusted execution environment, and responsive to determining existence of the root of trust on the computing platform, automatically unsealing data from a sealed storage facility of the peripheral device, the sealed storage facility being unsealed responsive to a root of trust being determined by the peripheral device to exist on the computing platform.

Yet further, a computer program product is provided for facilitating verification of trustworthiness of a computing platform by a peripheral device configured to couple to the computing platform. The computer program product includes a non-transitory storage medium readable by a processor and storing executable instructions for execution by the processor to facilitate performing a method. The method includes, for instance, dynamically assessing trustworthiness of the computing platform, the dynamically assessing including determining whether a root of trust exists on the computing platform, the root of trust including a trusted execution environment, and responsive to determining existence of the root of trust on the computing platform, automatically unsealing data from a sealed storage facility of the peripheral device, the sealed storage facility being unsealed responsive to a root of trust being determined by the peripheral device to exist on the computing platform.

Additionally, a method for facilitating verification of trustworthiness of a computing platform is provided, which method includes dynamically assessing, by a processor of a peripheral device configured to couple to a computing platform, trustworthiness of the computing platform, the dynamically assessing including determining whether a root of trust exists on the computing platform, the root of trust including a trusted execution environment, and responsive to determining existence of the root of trust on the computing platform, automatically unsealing data from a sealed storage facility of the peripheral device, the sealed storage facility being unsealed responsive to a root of trust bring determined by the peripheral device to exist on the computing platform.

In addition, a method for facilitating verification of trustworthiness of a computing platform is provided. The method includes issuing, by a processor of a peripheral device coupled to the computing platform, a challenge for execution by the computing platform, the challenge including one or more execution steps for producing a challenge response, obtaining by the processor a challenge response generated responsive to executing the challenge by the computing platform, determining by the processor whether the obtained challenge response matches an expected challenge response known to the peripheral device and unknown to the computing platform, wherein a match between the obtained challenge response and the expected challenge response indicates existence of a root of trust on the computing platform, and responsive to determining that the obtained challenge response matches the expected challenge response, automatically unsealing data from a sealed storage facility of the peripheral device, the sealed storage facility being unsealed responsive to a root of trust being determined by the peripheral device to exist on the computing platform.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Examples of hardware-enabled technology for evaluating trust of a computing platform include implementations of the Trusted Platform Module, based on a specification promulgated by the Trusted Computing Group™, as well as Hardware Dynamic Root of Trust Measurement (H-DRTM) technologies such as the Trusted Execution Technology (TXT) (offered by Intel Corporation, Mountain View, Calif.) and SKINIT (offered by Advanced Micro Devices, Sunnyvale, Calif.). Trusted Platform Module implementations are not alone sufficient for providing dynamic root of trust measurement, since they do not provide a root of trust (e.g. a trusted and/or isolated execution environment), and thus are susceptible to malware acting as a man-in-the-middle.

Unlike trusted platform modules alone, H-DRTMs measure root of trust but do so using other hardware such as (i) a trusted platform module of a motherboard of the system to be verified and (ii) additional central processing unit modifications to establish a dynamic root of trust (sometimes referred to as a 'secure late launch'). In one example, H-DRTMs may be used to securely measure the integrity of software. H-DRTMs, however, are available only in a small subset of laptop and desktop computers, are generally not found on servers, and currently do not exist on embedded devices. Furthermore, H-DRTM technology is relatively new and therefore few currently deployed computing systems incorporate it. Therefore, to create a computer system and network of computer systems today that supports secure end-to-end trust is prohibitive because it would require replacing existing computer systems with new H-DRTM enabled units, which is economically infeasible in many scenarios. Use of H-DRTMs is prohibitive because it requires both central processing unit and motherboard modifications, as well as a trust platform module-compliant BIOS, and specialized BIOS support.

Specific H-DRTM implementations also have their own inherent drawbacks. Intel's TXT, for instance, requires provisioning, and thus will not work with legacy systems or systems already setup and operating (i.e. not possible to implement an instant secure workstation). In addition to the above, existing H-DRTM technology is also not capable of measuring more than one piece of software at a time, and is primarily designed only to launch a trusted operating system or hypervisor.

Yet another disadvantage of current DRTMs is the presence of security vulnerabilities that have been found and that are capable of bypassing the implementation of a DRTM in a computing system. Current DRTMs are implemented predominantly in hardware, with the supporting software residing in the BIOS. Thus, when a bug is found, the BIOS must be at least be re-flashed and this is not easily accomplished. In a more drastic scenario, the bug resides in hardware and can be fixed only by fitting the machine with new hardware.

Software Dynamic Root of Trust Measurements (S-DRTM) have been developed to address some of the above issues. S-DRTM is a software-based DRTM similar to the above H-DRTMs with a defining difference being that S-DRTM does not require hardware modifications to the computing platform for which the DRTM is being performed. Instead, a S-DRTM implements a software challenge-response algorithm between a client and a remote server.

S-DRTMs do not require special hardware modifications, and thus can be used on legacy systems. However, because a S-DRTM is software-based, it does not have a secure storage facility in hardware for protecting sensitive data. Additionally, it is susceptible to network latency attacks, and it relies on a dedicated server to verify trust.

In accordance with one or more aspects of the present invention, a hardware device referred to herein as a trust enabling device is provided that employs an S-DRTM protocol. As explained in further detail below, the trust enabling device includes both dedicated hardware to evaluate and measure trust of a computing platform by way of a dynamic root of trust measurement, and software implementing a protocol for communicating the evaluated trust measurements. The trust enabling device provides currently-deployed computing platforms with functionality and advantages of both a H-DRTM and a S-DRTM without incurring the limitations noted above for those technologies. Advantageously, by using a trust enabling device, each computing platform (also referred to herein as a "node") on the network is able to evaluate its trustworthiness, communicate its trust measurements to other nodes, evaluate other nodes' trust measurements, and enable/disable services to other nodes based on their trustworthiness.

The trust enabling device provides protections similar to those afforded by hardware-based DRTMs, and also provides more convenient provisioning mechanisms without the need to include new hardware into the computing platform. The trust enabling device may be configured to work with any type of node on a network, including, but not limited to: desktops, laptops, servers, embedded systems, SCADA systems, and mobile platforms. In one particular embodiment, the trust enabling device is implemented as a peripheral component interconnect (PCI) add-on card, universal serial bus (USB) stick, or any form of plug-and-play device.

Figure 1:
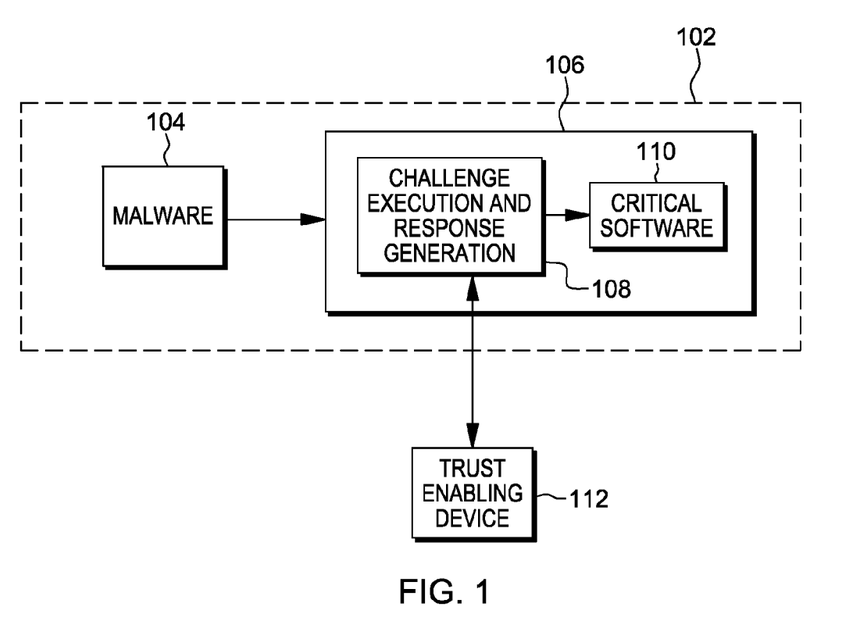
FIG. 1 depicts an example in which a trust enabling device is used to facilitate verification of trustworthiness of a compromised computer platform, in accordance with one or more aspects of the present invention.

The trust enabling device is configured to facilitate dynamically assessing trustworthiness of a computing platform by way of a dynamic root of trust measurement. The DRTM can be performed at any time, such as before or after the computing platform becomes compromised. FIG. 1 depicts an example in which a trust enabling device is used to assess trustworthiness of a compromised computing platform, in accordance with one or more aspects of the present invention. Computing platform 102 is compromised in that malware 104 is installed thereon. In this example, malware 104 is attempting to compromise execution environment 106, potentially rendering execution environment 106 untrustworthy.

Execution environment 106 includes challenge execution and response generation facility (in the form of, for instance, program code) 108 and critical software 110. In one example, critical software 110 comprises an operating system or hypervisor of computing platform 102. Challenge execution and response generation facility 108 receives a challenge from trust enabling device 112, which is, in one example, a device in communication with (and optionally coupled to) computing platform 102. The challenge can be randomly created to prevent offline reverse engineering, and be generated responsive to a request from computing platform 102 to receive a challenge, for instance upon a boot of computing platform 102 or prior to some execution of software (e.g. critical software 110 of FIG. 1) that is to be validated as trustworthy prior to executing.

Challenge execution and response generation facility 108 executes the challenge. The challenge is designed to assess the integrity of one or more components of computing platform 102, in this example critical software 110 and/or execution environment 106 in which critical software 110 is to run. In some embodiments, the challenge might execute to identify hardware attributes of the system, such as hardware identifiers or serial numbers.

A challenge response is generated responsive to the execution of the challenge and is provided to trust enabling device 112. A timer of trust enabling device 112 is started upon providing the challenge to challenge execution and response generation facility 108. This timer is used to determine the time it takes for computing platform 102 to execute the challenge and respond back to trust enabling device 112 with the challenge response, and thus helps in verifying that proper challenge execution was not emulated or reverse engineered, as is explained in further detail below. If the challenge response returned to trust enabling device 112 is invalid (that is, does not match what is expected to be returned by the computing platform), or if the time to execute the challenge took too long, the response from the trust enabling device 112 is considered invalid and the assessment will determine that a dynamic root of trust does not exist on computing platform 102. Alternatively, if the challenge response is valid and received sufficiently quickly (for instance below a pre-determined threshold of response time), then it is determined that a root of trust exists on computing platform 102, and more specifically that execution environment 106 is trusted, despite computing platform 102 having been compromised by malware 104.

Figure 2:
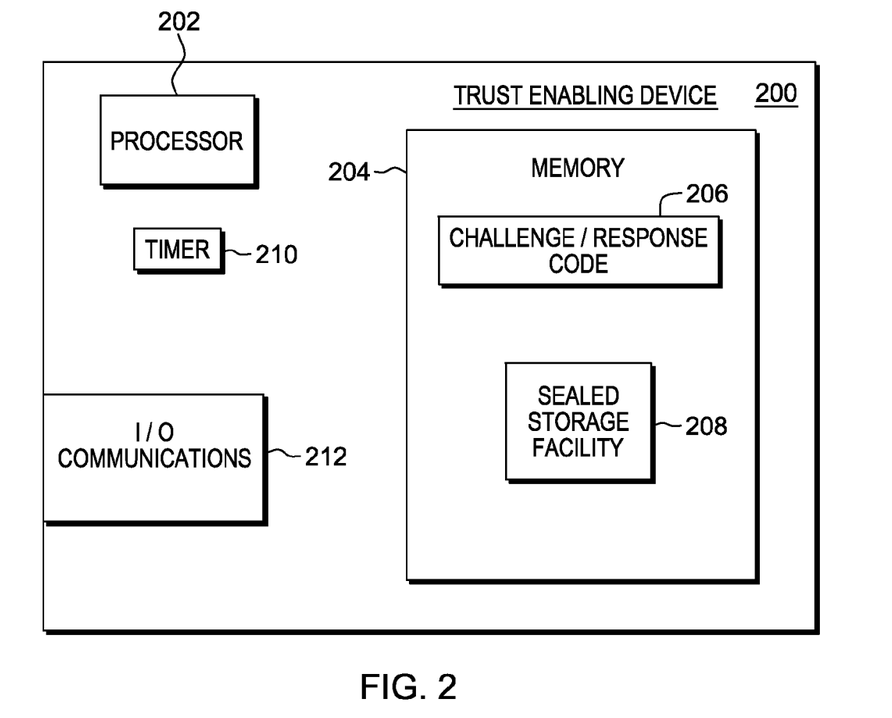
FIG. 2 depicts one example of a trust enabling device, in accordance with one or more aspects of the present invention.

FIG. 2 depicts an example embodiment of a trust enabling device in accordance with one or more aspects of the present invention. Trust enabling device 200 includes a processor 202 and memory 204. Processor 202 comprises any appropriate hardware component(s) capable of executing one or more instructions from memory 204, as is appreciated by those having ordinary skill in the art. Memory 204 includes challenge/response code 206 that is capable of generating a challenge for providing to a computing platform and evaluating a challenge response received from the computing platform in response to executing the provided challenge. In one example, challenge/response code 206 additionally comprises code capable of simulating execution of the challenge to obtain an expected challenge response for comparison to a received challenge response. Validity of the received challenge response is therefore determined based on a comparison of the received challenge response to the expected challenge response.

Memory 204 also includes a sealed storage facility 208. Sealed storage facility 208 is capable of sealing data that can be unsealed to allow access to that data after the computing platform being assessed has been verified by the trust enabling device 200 to be trustworthy. In one example, data is stored in memory regions of memory 204, which memory regions correspond to sealed storage facility 208 and which memory regions are accessible responsive to a root of trust being determined (by trust enabling device 200) to exist on the computing platform. In a particular embodiment, data in sealed storage facility is accessible if and only if a root of trust is established on the computing platform. As an example, program code stored in memory of the trust enabling device can regulate access to the data. Additionally, to further protect sealed storage 208, trust enabling device 200 can be configured to automatically erase memory 204 or a portion thereof (such as sealed storage facility 208 portion) upon physical tampering with trust enabling device 200.

Trust enabling device 200 also includes a timer 210, such as an internal clock, that is not controlled by the client computing platform. Timer 210 facilitates performance of accurate and tamper-proof measurements of response time, i.e. the time between providing the challenge to the computing platform and receiving the challenge response. As noted above, this aids in detection of emulation of challenge execution or active reverse engineering of the challenge response.

Additionally, trust enabling device 200 includes an input/output (I/O) communications interface component 212 for communicating data between trust enabling device 200 and a computing platform to which trust enabling device 200 is coupled. In one example, I/O communications interface component 212 comprises a network adapter for communication of data between trust enabling device 200 and other devices on a network to which trust enabling device 200 is connected, such as a computing platform being assessed across the network. In another embodiment, trust enabling device 200 comprises a universal serial bus (USB) or peripheral component interconnect (PCI) device, in which case I/O communications interface component 212 comprises, respectively, a USB or PCI adapter configured to couple to a USB or PCI port of the computing platform.

Figure 3:
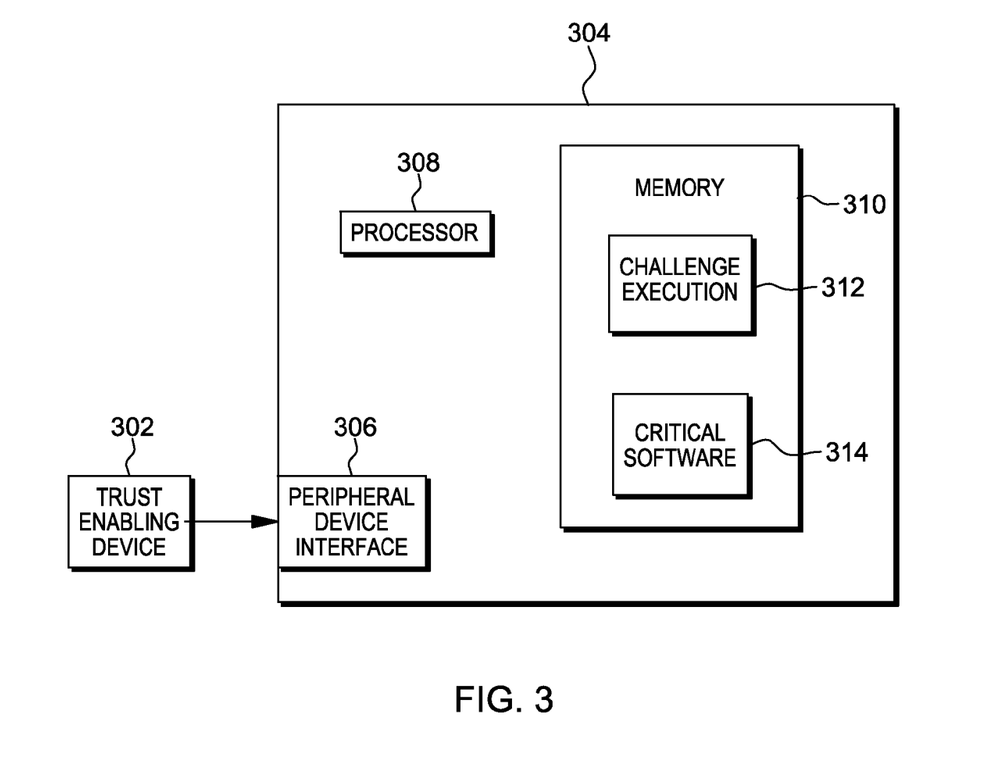
FIG. 3 depicts one example of a trust enabling device being coupled to a computing platform to facilitate verification of trustworthiness thereof, in accordance with one or more aspects of the present invention.

FIG. 3 depicts one example of a trust enabling device being coupled to a computing platform to facilitate verification of trustworthiness of the computing platform. In FIG. 3, trust enabling device 302 is a peripheral device that is physically coupled to a peripheral device interface 306 of computing platform 304. In one example, trust enabling device 302 comprises a USB device that and plugs into a USB port 306.

After being operatively coupled together, trust enabling device 302 and computing platform 304 can then communicate data between one another. In accordance with aspects of the present invention, trust enabling device 302 provides a challenge to computing platform 304 and computing platform 304 processes the challenge using processor 308 and challenge execution code 312 in memory 310. A challenge response is generated responsive to executing the challenge, and the challenge response is provided back to trust enabling device 302 for evaluation. Evaluation of the challenge response facilitates determination of whether a root of trust, that is a trusted execution environment, exists on computing platform 304. In one example, critical software 314 is thereafter enabled to execute only if the root of trust be determined to exist. This enabling may be accomplished by trust enabling device 302 unsealing and providing data (such as an encryption/decryption key) to computing platform 304 that enables the platform to execute/use critical software 314. In another example, critical software 314 is executing on computing platform 304 and execution of the challenge generates the challenge response based on values of registers or other data dynamically created or generated in response the execution of critical software 314 on computing platform 304. In this scenario, a mismatch between the generated challenge and an expected challenge response will indicate that critical software 314 or the execution environment in which the critical software 314 executes was compromised, and it is determined that a root of trust does not exist on computing platform 304.

In generating the challenge for the computing platform, the trust enabling device executes challenge/response code (e.g. 206 of FIG. 2) to perform randomization of software (i.e. randomization of the challenge elements such as instructions or execution steps for the computing platform to follow when executing the challenge) and analysis of challenge responses (received in the form of checksum(s) reported back by the computing platform, in one example). Measurement of software on the computing platform is performed by way of executing the challenge, and the sealing and unsealing of sensitive data is based on those measurements. Accordingly, the trust enabling device unlocks sensitive data via DRTM software of the trust enabling device. The sealed storage facility (e.g. 208 of FIG. 2) is capable of safely storing secretive information (data) and is configured to release such data responsive to a root of trust being established to exist. As noted above, the unsealed data could be data to enable execution or use of software on the computing platform. In another example, the unsealed data could include protected software that is provided to the computing platform for execution.

Figure 4A:
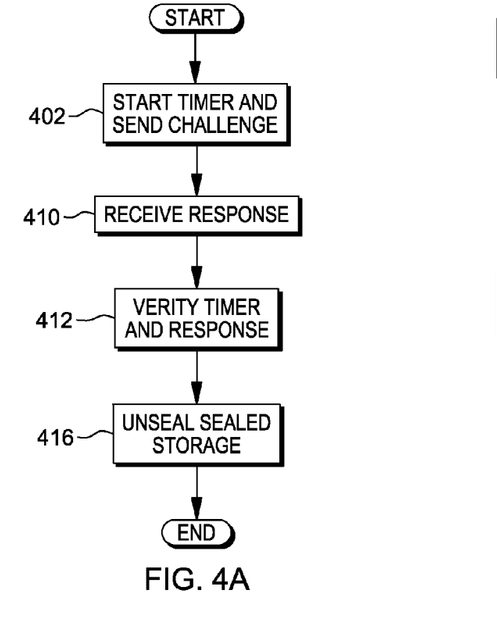
FIG. 4A depicts an example process of a trust enabling device to facilitate verification of trustworthiness of a computing platform, in accordance with one or more aspects of the present invention.
Figure 4B:
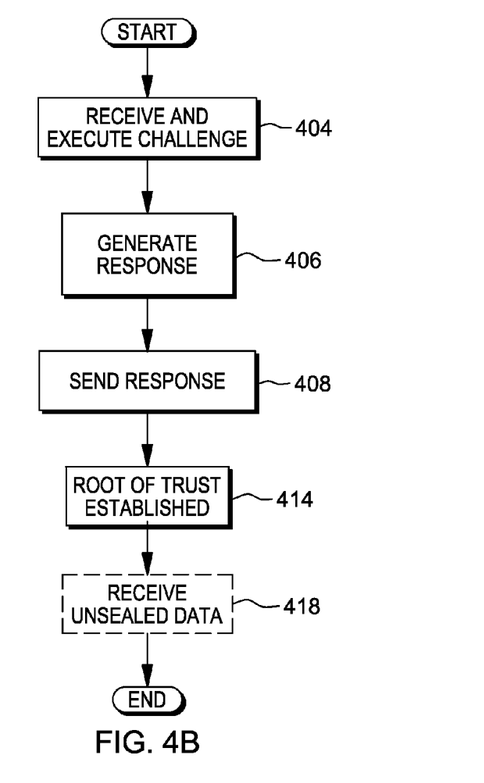
FIG. 4B depicts an example process of a computing platform to facilitate verification of trustworthiness of the computing platform, in accordance with one or more aspects of the present invention.

FIGS. 4A & 4B depict example processes to facilitate verification of trustworthiness of a computing platform, in accordance with one or more aspects of the present invention. FIG. 4A depicts an example process of a trust enabling device, while FIG. 4B depicts an example process of the computing platform. The two processes work in conjunction with one another and so are described collectively below.

To verify trustworthiness of the computing platform, the process begins by following a challenge-response protocol in which a challenge is issued to the computing platform, the challenge is executed to obtain a challenge response, and the response is delivered back to the issuer of the challenge. Referring to FIGS. 4A and 4B, the trust enabling device sends the challenge to the computing platform and starts the timer (402). In one example, the challenge is generated and sent by the trust enabling device responsive to a request by the computing platform to the trust enabling device to solicit a dynamic root of trust measurement of the computing platform, for instance when the computing platform wishes to prove its trustworthiness to another system. The challenge consists of software designed to verify that the computing platform and/or one or more components thereof (such as an execution environment) is in an expected state that can be verified to be secure. In one example, the challenge indicates one or more operations to be executed on the computing platform to generate the challenge response. The challenge is randomly created and elements thereof are randomly ordered, in one embodiment. This challenge might include (but is not limited to) instructions for execution to facilitate verifying the computing platform's system interrupt vectors or its execution state, or to detect the presence of virtual machine rootkits, as examples.

The computing platform receives and executes the challenge (404) to generate a challenge response (406). In one example, the challenge response comprises a checksum and is generated based on software and/or hardware being measured via the root of trust measurement (such as critical software 314 of FIG. 3). The challenge response is then sent (408) to the trust enabling device. The trust enabling device receives the response (410) and verifies the response and timer (412). For instance, the trust enabling device examines the received response and compares it against an expected response. The expected response may be generated independently by the trust enabling device using the challenge issued to the computing platform. A mismatch between the challenge response and the expected challenge response will indicate that the computing platform is not trustworthy, i.e. a root of trust does not exist.

Verifying the timer includes determining a time that was taken to receive the response from the computing platform. In this regard, the value of the timer when the response was received can indicate a time taken to receive the response (i.e. if the timer starts at zero and counts up, for instance). In another example, timer identifies a non-zero time value (such as the time of day), and the time taken is determined based on the time of day at which the challenge is sent and the time of day at which the challenge response was received.

Figure 5:
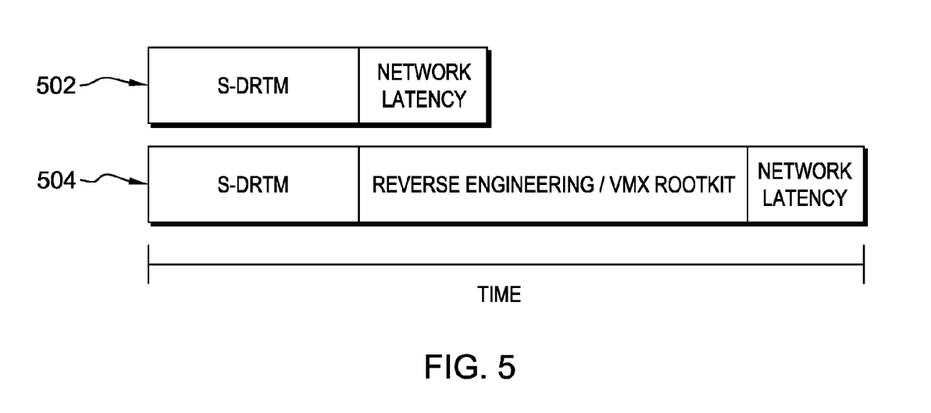
FIG. 5 illustrates a comparison in response time between a software-based dynamic root of trust measurement of an untrustworthy computing platform and a software-based dynamic root of trust measurement of a trustworthy computing platform, in accordance with one or more aspects of the present invention.

FIG. 5 illustrates a comparison in response time taken by a trustworthy computing platform versus an untrustworthy platform. 502 of FIG. 5 denotes the case of a trustworthy platform, in which the time taken includes the time taken for the S-DRTM (execution of the challenge) and the network latency which refers to the time to transfer the generated challenge response from the computing platform to the trust enabling device. In contrast, 504 of FIG. 5 denotes the case of an untrustworthy platform, in which malware or another form of malicious code must reverse engineer the challenge execution or activate a VMX hypervisor rootkit in order to generate the correct response. A VMX hypervisor rootkit, for example, is a rogue hypervisor that can monitor the computer's actions and manipulate the results of the measurements obtained from executing the challenge. However, the extra time taken for these actions by the VMX hypervisor rootkit or other malware will obviously delay the sending and receipt of the response. A threshold amount of time denoting the maximum allowable time to generate and transmit the response can be established by determining an expected amount of time to execute the challenge based, for instance, on processing speed and capability of the computing platform. The trust enabling device can compare the timer value (indicating the actual time to respond) against the threshold. A response received in an amount of time below the threshold amount of time is deemed valid, whereas a response received in an amount of time above the threshold amount of time is deemed invalid.

The example challenge-response protocol described above is just one example. Any suitable challenge-response protocol can be employed, examples of which include the protocols described in: Seshadri et al., "PIONEER: VERIFYING CODE INTEGRITY AND ENFORCING UNTAMPERED CODE EXECUTION ON LEGACY SYSTEMS," in Proceedings of the Twentieth ACM Symposium on Operating Systems Principles, Vol. 39, No. 5. (December 2005), pp. 1-16; and Martignoni et al., "CONQUEROR: TAMPER-PROOF CODE EXECUTION ON LEGACY SYSTEMS," in Christian Kreibich, Marko Jahnke, editors, Detection of Intrusions and Malware, and Vulnerability Assessment, 7th International Conference, DIMVA 2010, Bonn, Germany, Jul. 8-9, 2010, *Proceedings*, Volume 6201 of *Lecture Notes in*

*Computer Science*, pages 21-40, Springer, 2010, both of which are hereby incorporated herein by reference in their entirety.

Further details are provided of an example challenge-response protocol. The challenge can be a piece of software, generated by the trust enabling device, that is executed by a client computer (the computing platform being assessed. The challenge can contain a group of components, each of which is executed in a random order. A component is, in one example, a single piece of code designed to measure a portion of the computing platform. For example, a component might hash a piece of code, or it might identify the current state of the CPU of the computing system.

A goal of one of more of the described components can be to both set the state of the computing platform into one that is protected against subjugation, as well as to verify that the computing platform's state and root-of-trust has not been tampered with by, for instance, a malicious attacker.

The challenge can utilize the state that it detects to generate a checksum of the computing platform being checked. This checksum is, in one embodiment, randomized and changes with every execution of the challenge-response protocol. The trust enabling device verifies the checksum and, in doing so, ascertains the state of the computing platform.

Challenge Components: The following outlines a specific aspect of the computing platform that can be verified, how the challenge will operate, and how it can be randomized. Additionally, each challenge component can also be compiled with a binary obfuscator to inhibit reverse engineering attempts.

Memory Verification—Throughout the challenge execution, there can be a component that checksums critical regions of memory in sections (what makes a region critical is determined by the use case of the SDRTM). The order of which section is checksummed is randomized each time the challenge-response protocol is executed, in one example. The randomization can be a permutation of the section list, ensuring that every byte in the critical region is verified. These memory verification components can be strewn throughout the other verification components to prevent real-time reverse engineering.

Interrupts—In addition to wiping system memory, it may be advantageous to prevent other processes from executing while the challenge is operating. Thus, in this case, any code capable of interrupting the SDRTM must be verified, which can be accomplished via interrupt based components. An example of an interrupt component on the x86 architecture is the Interrupt Vector Table (IVT). In this example, the IVT, and the handlers must be verified. In some cases, the IVT handlers should be replaced with new handlers designed to invalidate the checksum if executed (preventing an attacker from using interrupts).

VMX Detection—With the addition of hardware virtualization, the possibility of a malicious hypervisor or dynamic reverse engineering can be addressed by the SDRTM. If the measurements pass, but there is nonetheless still a malicious hypervisor installed, then that hypervisor could taint the 'trusted' application. One method for detecting the presence of a hypervisor is to compare the expected time of an operation that triggers the hypervisor with the actual time to execute. Since the trust enabling device is provided with its own internal timer/clock, it is possible to detect if the hypervisor is trapping on certain instructions.

System State Verification—The challenge can also record various settings of the system, such as the value of certain control registers to make the sure the system is in a state consistent with what is expected by the trust enabling device. On an x86 computer system, for instance, they can include the CR0-CR4 registers, PCI configuration space values, and DR0-DR7 values.

The aforementioned challenge components are examples of the possible aspects of the computing platform's security than can be measured and verified by the trust enabling device. The challenge-response architecture however can be re-targeted and adapted to new and future systems, allowing the same security guarantees. That is, the above are provided only as examples. The SDRTM challenge components could include any element to measure of verify the state of the computing platform being assessed.

As noted above, the trust enabling device is able to verify the challenge response (i.e. checksum value) from the computing platform. Since the trust enabling device generates the random ordering of execution and, in one example, determines a seed for a deterministic pseudo-random number generator (PRNG) to facilitate challenge execution, the trust enabling device possesses information necessary to determine the appropriate challenge response (checksum). The trust enabling device therefore can simply emulate execution of the challenge (as there is not a strict time-limit on the trust enabling device's execution), and when a system value is needed in executing the challenge, the expected value is used instead.

Returning to FIG. 4A, if the timer and response are verified—that is, the computing platform has responded to the trust enabling device with the correct challenge response (e.g. checksum) and in the correct amount of time—a root of trust is verified and established to exist (414). Responsive to this determination, data of the sealed storage facility is automatically unsealed (416). The data is optionally provided to the computing platform, in which case the computing platform receives the unsealed data (418). In other embodiments, the unsealed data is provided to a separate device, such as another computing platform on a network of which the trust enabling device is a part. Unsealed data includes any sensitive data, the protection and release of which is dependent on the presence of a root of trust of the computing platform.

Thus, in one example, software on the computing platform is measured and verified using a challenge-response algorithm in which a checksum is generated based on the software (i.e. code and/or state thereof) and compared against an expected checksum. The algorithm and challenge are randomly created to prevent offline reverse engineering. If the computing environment to be verified is modified in any way, the generated checksum will be invalid. Furthermore, if the processing to generate the checksum or if the execution environment is tampered with in any way, the checksum generated and delivered to the trust enabling device will be invalid.

As is seen from the foregoing, the trust enabling device provides a hybrid hardware/software dynamic root of trust measurement for dynamically verifying a root of trust without the need for processor and motherboard modifications to the computing platform being assessed, and without the limitations described above of current S-DRTMs. The trust enabling device will serve as a verifying, hardware-based device to place the computing platform in a trusted state, and to verify the integrity of the system and the integrity of requested software. Unlike existing S-DRTMs, the trust enabling device's S-DRTM provides a software-defined dynamic root of trust via a dedicated hardware add-on (PCI, USB, etc) and provides secure storage, accessible responsive to the DRTM executing and the computing platform being determined to be in a safe state (root of trust is confirmed).

Additionally, the trust enabling device can detect VMX hypervisor rootkits, operate in multi-core environments, and in one example, does not rely on a third-party server (and thus is not susceptible to man-in-the-middle attacks and network latency attacks).

The trust enabling device also provides true remote attestation in that the trust enabling device will use its sealed storage and DRTM to provide hardware-enabled attestation that is capable of locally attesting to the system and user, as well as remotely attesting to other nodes on a network. Unlike current H-DRTM-only implementations, the trust enabling device does not require organizations to purchase new hardware, other than the trust enabling device, to provide such end-to-end trust. To the rest of the network, a node using the trust enabling device may be configured to operate the same as a node using an H-DRTM and thus, the two technologies may co-exist, providing a cost effective method for migrating an existing system to a more secure posture (for example securing existing critical infrastructure applications). The hardware, software, and protocols disclosed herein may also be used with current H-DRTM technologies if desired to provide a more flexible end-to-end trusted network that scales with future technologies.

In one example, several nodes on a network are capable of measuring trust, for instance by way of a trust enabling device at one or more nodes, so that the nodes on the network are to be able to establish trusted connections between each other. To accomplish this, a secure, multi-directional remote attestation protocol, such as the Sailer protocol disclosed in Coker et al., PRINCIPLES OF REMOTE ATTESTATION, International Journal of Information Security, Vol. 10 Issue 2, Springer, 2010 (which is hereby incorporated herein by reference in its entirety) is leveraged to ensure that all communicating devices are trustworthy and operate in a trustworthy environment. In one example, to create mutual remote attestation, this protocol will be performed by the several nodes in combination. Program code to implement the protocol may be stored in memory of the trusted hardware device and/or on each computing platform.

To provide better scalability to many clients/servers connecting to each other, a root certificate authority (CA) will optionally be added. If a root CA decides to trust a node, it will sign that node's certificate, which can then be shared to prove to others that the CA trusts the node. In one example, data unsealed from the trust enabling device comprises security signature data for signing a security certificate associated with a computing platform which is determined to be trustworthy. The trust enabling device can be configured to sign a security certificate associated with the computing platform after it is determined to be trustworthy, and the computing platform can provide the signed security certificate to other computing platforms as proof of its trustworthiness.

The remote attestation protocol is designed to provide evidence of the authenticity of a node's hardware, as well as proof that the node and its measured software have not been compromised. The protocol can ensure that each node will be capable of successfully communicating with other nodes only if the node contains approved, provisioned hardware and its authentication software is in good standing. Attestation data unsealed from a trust enabling device pursuant to the protocol described above and indicating trustworthiness of a node can be sent in a trust message to other node(s) to identify the trusted node, its location, and its system components. In one example, the attestation data to prove trustworthiness of one node for another node is transmitted from the trust enabling device to the other node. For instance, the trust enabling device provides the attestation data to the other node by way of the node being verified, in which case the attestation data is provided from the trust enabling device to the node being verified, and then the node being verified provides the attestation data to the other node.

The aforementioned protocol also provides a way for one node to verify a trust message of another node. For example, node B might be willing to trust node A if and only if node A can reply to node B with a nonce signed/encrypted for B. In this case, the nonce can be signed by a private key of node A, which is stored securely in the sealed storage facility of the trust enabling device, and therefore is protected in the sealed storage, and accessed only after node A is determined to be in a trusted state. The encrypted nonce can be provided to the separate device (node B) for decryption (i.e. reversal of the encryption that was provided by node A's private key) to obtain the original nonce. If the original nonce is obtained after reversing the encryption, then the private key was used for performing the encryption, which verifies that the sealed private key was securely obtained, and therefore proves trustworthiness of the computing platform of node A.

In one example, responsive to determining existence of the root of trust on the computing platform, the trust enabling device provides sensitive data to the computing platform to facilitate use of critical software on the computing platform. The critical software could optionally be stored in the memory of the peripheral device and provided to the computing platform for execution, or the critical software could exist on the computing platform and be verified as part of the trustworthiness assessment of the computing platform. In one specific example, unsealed data includes a key for encryption/decryption for use with the software.

By way of a specific example, assume a user wishes to execute a secure chat client program on a particular computer but that computer is untrusted. Assume also that the chat client uses an encrypted channel for communicating with another party on another platform, such as a server platform that is known to be trustworthy. The encrypted channel requires the encryption key in order to be setup. It is, however, not desirable to provide the encryption key to the computer without first verifying its trustworthiness to execute the chat client using the encrypted channel. In this example, the trust enabling device can be used to first perform a dynamic root of trust measurement to establish that the computer can be trusted, and then, once the platform is verified, the sealed storage facility is opened to unseal the encryption key which is then provided to the computing platform (and the chat client executing thereon) in order to establish the encrypted channel with the server platform.

The trust enabling device disclosed herein can advantageously bolster and improve the security of existing networked computer systems by providing the systems with the hardware, software, and protocols required to facilitate an end-to-end trusted network. Each computing platform on the network can utilize hardware-enabled secure storage, root-of-trust, and remote attestation, such as is provided by the trust enabling device disclosed herein. The trust enabling device may be used with any remote attestation framework, for instance the Sailer framework noted above, to provide a baseline end-to-end trusted network.

The trust enabling device disclosed herein advantageously facilitates determination of whether a computing platform is in good standing and trustworthy, verification of the authenticity of a system's hardware and the system's identity, and communication and evaluation of trust messages from one system to another.

Unlike existing hardware-based solutions that facilitate end-to-end trust, the trust enabling device disclosed herein provides interoperability and support for end-to-end trust in existing computing infrastructures. Whereas existing commercially available technologies likely necessitate replacement of hardware and software, the trust enabling device works with existing systems to provide the hardware required to facilitate end-to-end trust. Furthermore, the trust enabling device disclosed herein may interoperate with H-DRTM solutions, providing a means for migrating existing networks gradually from an H-DRTM approach to one that utilizes the trust enabling device.

Aspects of the present invention advantageously facilitate, as examples: (i) determining whether a system is in good standing (i.e. whether system software has been modified); (ii) determining whether a system is trustworthy (proof that a system is executing trusted software); (iii) determining the authenticity of a system's hardware; (iv) identifying a system (e.g. the system's location, and/or components); (v) communicating and evaluating trust messages from one system to another; (vi) providing legacy systems with hardware enabled trust facilities; and (vii) interoperation with existing H-DRTM technologies to provide a cost effective method for critical infrastructure migration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 6:
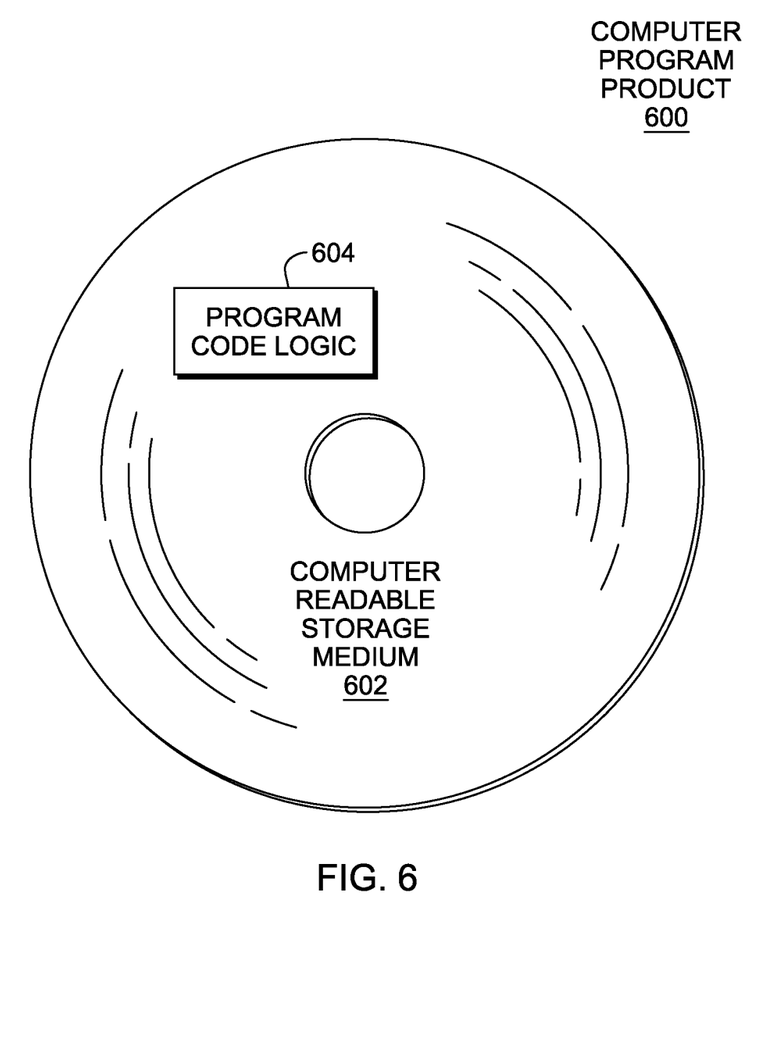
FIG. 6 depicts one embodiment of a computer program product to incorporate one or more aspects of the present invention.

Referring now to FIG. 6, in one example, a computer program product 600 includes, for instance, one or more computer readable media 602 to store computer readable program code means or logic 604 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method comprising:
   dynamically assessing, by a processor of a peripheral device configured to couple to a computing platform, trustworthiness of the computing platform, the dynamically assessing comprising performing a dynamic root of trust measurement of the computing platform to determine whether a root of trust exists on the computing platform, the root of trust comprising a trusted execution environment, and the dynamic root of trust measurement configured to detect for presence of a Virtual Machine Extension rootkit, wherein performing the dynamic root of trust measurement comprises:
      providing a challenge to the computing platform for execution by the computing platform, the challenge comprising at least one operation configured to trigger execution of a Virtual Machine Extension hypervisor present on the computing platform;
      starting a timer of the peripheral device;
      responsive to receiving a challenge response from the computing platform, determining, based on a value of the timer, an amount of time for the computing platform to respond with the challenge response, wherein execution of the challenge by the computing platform comprises execution of the at least one operation by the Virtual Machine Extension hypervisor, wherein the execution of the at least one operation by the Virtual Machine Extension hypervisor contributes to a delay in responding to the challenge; and
      determining that a root of trust does not exist on the computing platform based, at least in part, on the delay in responding contributed by the execution of the at least one operation by the Virtual Machine Extension hypervisor.

2. The method of claim 1, wherein performing the dynamic root of trust measurement further comprises comparing the received challenge response to an expected challenge response to determine whether the received challenge response matches the expected challenge response.

3. The method of claim 1, wherein the challenge response comprises a checksum generated by the computing platform based, at least partially, on software being measured via the dynamic root of trust measurement, and wherein modification to the software results in an invalid checksum being received from the computing platform as part of the received challenge response.

4. The method of claim 1, wherein the dynamic root of trust measurement assesses integrity of software of the computing platform prior to an execution of the software on the computing platform, and wherein the software is at least one of a software application, firmware, a virtual machine, a hypervisor, an operating system, or a basic input/output system.

5. The method of claim 1, wherein the peripheral device comprises a universal serial bus device or a peripheral component interconnect device.

6. The method of claim 1, wherein the peripheral device is a removable plug-and-play device configured to couple externally to the computing platform.

7. A method comprising:
   issuing, by a processor of a peripheral device coupled to a computing platform, a challenge for execution by the computing platform, the challenge comprising one or more execution steps for producing a challenge response, and the challenge comprising one or more operations for performance to facilitate detecting for presence of a virtual machine rootkit;
   obtaining by the processor a challenge response generated responsive to executing the challenge by the computing platform, wherein the obtained challenge response matches an expected challenge response known to the peripheral device; and
   determining that a root of trust does not exist on the computing platform, despite the match between the obtained challenge response and the expected challenge response, wherein execution of the challenge by the computing platform comprises execution of the at least one operation by a Virtual Machine Extension hypervisor of the computing platform, the execution of the at least one operation by the Virtual Machine Extension hypervisor contributing to a delay in responding to the challenge, and the determination that a root of trust does not exist on the computing platform is based at least in part on the delay in responding contributed by the execution of the at least one operation by the Virtual Machine Extension hypervisor.

8. The method of claim 7, wherein the challenge response comprises a checksum generated by the computing platform based, at least partially, on software being measured via a dynamic root of trust measurement, and wherein modification to the software results in an invalid checksum being received from the computing platform as part of the received challenge response.

9. The method of claim 8, wherein the dynamic root of trust measurement assesses integrity of software of the computing platform prior to an execution of the software on the computing platform, and wherein the software is at least one of a software application, firmware, a virtual machine, a hypervisor, an operating system, or a basic input/output system.

10. The method of claim 7, wherein the peripheral device comprises a universal serial bus device or a peripheral component interconnect device.

11. The method of claim 7, wherein the peripheral device is a removable plug-and-play device configured to couple externally to the computing platform.

* * * * *